(12) United States Patent
Zhang

(10) Patent No.: US 12,101,746 B2
(45) Date of Patent: Sep. 24, 2024

(54) METHOD AND DEVICE FOR WIRELESS COMMUNICATION ON RANDOM ACCESS

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 757 days.

(21) Appl. No.: 17/185,977

(22) Filed: Feb. 26, 2021

(65) Prior Publication Data

US 2021/0212042 A1 Jul. 8, 2021

Related U.S. Application Data

(63) Continuation of application No. PCT/CN2020/140040, filed on Dec. 28, 2020.

(30) Foreign Application Priority Data

Jan. 2, 2020 (CN) .......................... 202010000403.1

(51) Int. Cl.
*H04W 72/044* (2023.01)
*H04L 5/00* (2006.01)
(Continued)

(52) U.S. Cl.
CPC .......... *H04W 72/044* (2013.01); *H04L 5/0032* (2013.01); *H04W 74/0833* (2013.01)

(58) Field of Classification Search
CPC ........... H04W 72/044; H04W 74/0833; H04W 48/10; H04W 74/002; H04L 5/0032; H04L 5/0094
See application file for complete search history.

(56) References Cited

U.S. PATENT DOCUMENTS

| 2008/0095185 A1* | 4/2008 | DiGirolamo .......... H04L 1/0026 370/464 |
| 2008/0205433 A1* | 8/2008 | Pihlaja ................ H04W 74/004 370/461 |

(Continued)

FOREIGN PATENT DOCUMENTS

| EP | 2898745 B1 * | 5/2018 | ........... H04L 5/0057 |
| EP | 3216300 B1 | 8/2018 | |
| WO | WO-2017180258 A1 * | 10/2017 | ........ H04W 36/0072 |

OTHER PUBLICATIONS

International search report on application PCT/CN2020/140040, dated Apr. 7, 2021.

(Continued)

*Primary Examiner* — Tejis Daya

(57) ABSTRACT

The disclosure provides a method and a device for wireless communication. A first signaling is received, the first signaling including a first identifier and a second identifier; and a first signal is transmitted; wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access. Through reasonably associating the second identifier to the second time-frequency resources in K1 cells, with the first node transmitting K2 candidate cells to facilitate random access, the disclosure improves the rate of successful access.

19 Claims, 6 Drawing Sheets

(51) Int. Cl.
  *H04W 74/08*      (2024.01)
  *H04W 74/0833*    (2024.01)

(56) References Cited

U.S. PATENT DOCUMENTS

2009/0086671 A1* 4/2009 Pelletier ................ H04W 76/27
                                                  370/329
2012/0142357 A1* 6/2012 Aminaka .......... H04W 36/0058
                                                  455/437
2014/0192783 A1* 7/2014 Zhao ........................ H04J 13/18
                                                  370/335
2019/0124636 A1* 4/2019 Jiang ................... H04W 72/044
2019/0394805 A1* 12/2019 Kim .................. H04W 74/0833

OTHER PUBLICATIONS

European search opinion on application EP20829516.2, dated Feb. 6, 2023.

* cited by examiner

METHOD AND DEVICE FOR WIRELESS COMMUNICATION ON RANDOM ACCESS

CROSS REFERENCE TO RELATED APPLICATIONS

This application is a continuation of International Application No. PCT/CN2020/140040, filed Dec. 28, 2020, claims the priority benefit of Chinese Patent Application No. 202010000403.1, filed on Jan. 2, 2020, the full disclosure of which is incorporated herein by reference.

BACKGROUND

Technical Field

The disclosure relates to transmission methods and devices in wireless communication systems, and in particular to a transmission method and device in wireless communication to reduce time latency, improve transmission reliability and reduce power consumption, which is related to a non-terrestrial network.

RELATED ART

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR) (or 5G). The work item of NR was approved at the 3GPP RAN #75 session to standardize the NR.

In communication process, both Long Term Evolution (LTE) and 5G NR will involve reliable system access, which is of great significance for the normal communication between base stations and UEs, for the reasonable scheduling of resources and for the effective coordination of system interferences. It is fair to say that enhanced Mobile BroadBand (eMBB), Ultra Reliable Low Latency Communication (URLLC) and enhanced Machine Type Communication (eMTC) are all indispensable foundations to improve throughput and spectrum utilization. Meanwhile, system access is widely used in Industrial Internet of Things (IIoT), in Vehicular to X (V2X), in Device to Device, in unlicensed spectrum communication, in user communication quality monitoring, in network planning and optimization, in Non Territorial Network (NTN), in Territorial Network (TN), in any combinations of the above, in radio resource management and in multi-antenna codebook selection.

With the increasing scenarios and complexity of systems, higher requirements are put forward for latency reduction, reliability enhancement, system stability enhancement, and fast and reliable access; meanwhile, compatibility need to be taken into account between different systems and different versions when designing the systems.

SUMMARY

In a variety of communication scenarios, a user needs to access a network first if he/she needs to initiate communication; during the communication process, if signal quality is deteriorated, even communication interruption occurs, due to problems of transmitting or receiving side, or due to impact of communication transmission latency, or due to non-ideal device factors, a UE needs to access the network again. If one time of access fails, the user needs to perform re-access, then the total latency of access increases. In order to reduce interruption time, to improve success rate of access, to access system fast and to reduce overall communication latency, a fast, reliable and stable access method is of great importance; particularly, when high latency occurs during the process due to a long distance between nodes, or some other reasons, for example, signal detection failure, further uncertainty will occur during the access process, thereby causing communication interruption. This will lead to reduction of resource efficiency, unguaranteed communication quality, impossibility of nodes to establish an effective communication bearer, and various disorders. On the other hand, the latency during communication process will lead to incorrect measurements, or measurement results are expired due to mobility, which would cause a user to initiate access on improper resources, thereby causing access difficulty and increasing access latency. This problem is particularly prominent for networks with high transmission latency. In addition, different systems might have different design criteria, precisions and geographical locations, and various communication scenarios might be mixed, all of which bring a problem to the design of system.

In view of the above problems, the disclosure provides a solution.

It should be noted that embodiments of any node in the disclosure and characteristics in the embodiments may be applied to any other node if no conflict is incurred. The embodiments in the disclosure and characteristics in the embodiments may be mutually combined arbitrarily if no conflict is incurred. In addition, it should be noted that in the above problem description the NTN scenario is merely an example of one application scenario for the solution provided by the disclosure; the disclosure is also applicable to scenarios of, for example, territorial networks, and can achieve similar technical effects as in NTN scenarios. Similarly, the disclosure is also applicable to scenarios of networks having, for example, Unmanned Aerial Vehicle (UVA) or IoT device, and can achieve similar technical effects as in NTN scenarios. Furthermore, the adoption of a unified solution by different scenarios (including, but not limited to, NTN scenarios and territorial network scenarios) helps reduce the complexity and cost of hardware.

The disclosure provides a method in a first node for wireless communication, wherein the method includes:
  receiving a first signaling, the first signaling including a first identifier and a second identifier; and transmitting a first signal.

Herein, the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, the problem to be solved by the disclosure includes: when a node initiates random access, due to the impact of mobility and latency, a received random access signal changes when reaching a receiving node;

therefore, how to reliably access a system in such condition is one problem to be solved by the disclosure. The above method solves this problem by appropriately associating the second time-frequency resource set to the second identifier and the second identifier to one cell group.

In one embodiment, the above method is characterized in that: the first signaling includes a System Information Block (SIB), and the first signaling is transmitted on a Physical Downlink Shared Channel (PDSCH).

In one embodiment, the above method is characterized in that: the first signaling is transmitted on a Physical Sidelink Broadcast Channel (PSBCH).

In one embodiment, the above method is characterized in that: the first signaling is configured through a dedicated signaling when the first node accesses the system last time.

In one embodiment, the above method is characterized in that: the first time-frequency resource set includes at least one resource unit.

In one embodiment, the above method is characterized in that: the second time-frequency resource set includes at least one resource unit.

In one embodiment, the above method is characterized in that: the resource unit is RE.

In one embodiment, the above method is characterized in that: the first identifier includes a Physical Cell Identifier (PCI).

In one embodiment, the above method is characterized in that: the first identifier includes a beam index.

In one embodiment, the above method is characterized in that: the first identifier includes an NR Cell Global Identifier (NCGI).

In one embodiment, the above method is characterized in that: the second identifier includes a PCI.

In one embodiment, the above method is characterized in that: the second identifier includes a beam index.

In one embodiment, the above method is characterized in that: the second identifier includes an NCGI.

In one embodiment, the above method is characterized in that: the first identifier is used for generating a signal transmitted in the first time-frequency resource set.

In one embodiment, the above method is characterized in that: the first time-frequency resource set belongs to a cell determined by the first identifier.

In one embodiment, the above method is characterized in that: a Demodulation Reference Signal (DM-RS) transmitted in the first time-frequency resource is determined by the first identifier.

In one embodiment, the above method is characterized in that: a cell determined by the first identifier is selected as a home cell by a node that transmits a signal in the first time-frequency resource set.

In one embodiment, the above method is characterized in that: the second identifier is used for generating a signal transmitted in the second time-frequency resource set.

In one embodiment, the above method is characterized in that: the second time-frequency resource set belongs to a cell set determined by the second identifier.

In one embodiment, the above method is characterized in that: a Demodulation Reference Signal (DM-RS) transmitted in the second time-frequency resource is determined by the second identifier.

In one embodiment, the above method is characterized in that: the first signal includes a preamble.

In one embodiment, the above method is characterized in that: the first signal includes a msg1 (message 1).

In one embodiment, the above method is characterized in that: the first signal includes a msgA (message A).

In one embodiment, the above method is characterized in that: the first signal is transmitted on a Physical Random Access Channel (PRACH).

In one embodiment, the above method is characterized in that: the first identifier is not associated to cells other than the first cell.

In one embodiment, the above method is characterized in that: the first identifier is used for determining time-frequency resources of the first cell only.

In one embodiment, the above method is characterized in that: the first identifier is used for generating a signal within the first cell only.

In one embodiment, the above method is characterized in that: the first identifier is directly mapped to the first cell.

In one embodiment, the above method is characterized in that: the second identifier is directly mapped to the first cell group.

In one embodiment, the above method is characterized in that: the second identifier is directly mapped to each cell in the first cell group.

In one embodiment, the above method is characterized in that: the second identifier is used for determining time-frequency resources of the first cell group only.

In one embodiment, the above method is characterized in that: the second identifier is used for generating a signal within the first cell group only.

In one embodiment, the K1 is equal to 2.
In one embodiment, the K1 is equal to 3.
In one embodiment, the K1 is equal to 4.
In one embodiment, the K1 is equal to 8.
In one embodiment, the K1 is equal to 16.
In one embodiment, the K1 is equal to 32.

In one embodiment, the above method is characterized in that: the first signal occupies a resource unit in the second time-frequency resource set.

In one embodiment, the above method is characterized in that: the first signal occupies a resource unit in the second time-frequency resource set only.

In one embodiment, the above method is characterized in that: the target cell is a receiver of the first signal.

In one embodiment, the above method is characterized in that: the target cell is a transmitter of a feedback signal of the first signal.

In one embodiment, the above method is characterized in that: the first signal includes a preamble signal in a 2-step Random Access Channel (2-step RACH).

In one embodiment, the above method is characterized in that: the first signal is used for 2-step random access.

In one embodiment, the above method is characterized in that: the first signal is used for fallback 2-step random access.

In one embodiment, the above method is characterized in that: the first signal is used for 2-step RACH.

In one embodiment, the above method is characterized in that: the first signal is used for 4-step random access.

In one embodiment, the above method has the following benefits: a random access signal transmitted by a user during movement or at a cell edge can also be well received and processed by a network.

Specifically, according to one aspect of the disclosure, the first signal is used for determining K2 candidate cells, and the target cell is one of the K2 candidate cells.

In one embodiment, the K2 candidate cells belong to the first cell group.

In one embodiment, at least one of the K2 candidate cells does not belong to the first cell group.

In one embodiment, at least one of the K2 candidate cells does not belong to the first cell group, and the target cell belongs to the first cell group.

Specifically, according to one aspect of the disclosure, the first signaling includes a third identifier, a cell to which the first node is attached is the first cell among the K1 cells, the third identifier is used for identifying the first cell among the K1 cells; and the third identifier is different from the first identifier.

In one embodiment, the third identifier includes an index of the first cell in the K1 cells.

In one embodiment, the third identifier is a hash value, which is used for determining the first cell among the K1 cells.

Specifically, according to one aspect of the disclosure, a second signal is received in a third time-frequency resource set.

Herein, the second time-frequency resource set is used for determining the third time-frequency resource set; whether the second signal includes the second identifier is used for determining whether a transmitter of the second signal receives the first signal.

In one embodiment, the above method is characterized in that: the third time-frequency resource set includes at least one resource unit.

In one embodiment, the above method is characterized in that: the second signal includes a Random Access Response (RAR).

In one embodiment, the above method is characterized in that: the second signal includes an RAR to a fallback 2-step RACH.

In one embodiment, the above method is characterized in that: the second signal includes a MsgB (Message B).

In one embodiment, the second time-frequency resource set and the third time-frequency resource set have a mapping relationship.

In one embodiment, the second time-frequency resource set includes the third time-frequency resource set.

In one embodiment, a signal transmitted in the second time-frequency resource set and a signal transmitted in the third time-frequency resource set are associated to one same Synchronization Signal Block (SSB).

Specifically, according to one aspect of the disclosure, a second signal is received in a third time-frequency resource set.

Herein, the target cell is used for determining the third time-frequency resource set; whether the second signal includes the second identifier is used for determining whether a transmitter of the second signal receives the first signal.

In one embodiment, the third time-frequency resource set includes time-frequency resources of the target cell.

Specifically, according to one aspect of the disclosure, the first signal is used for indicating second information, and the second information is used for indicating priorities of the K2 candidate cells.

In one embodiment, the second information indicates explicitly the priorities.

In one embodiment, the first signal indicates explicitly the second information.

In one embodiment, the second information determines that a ranking order of the K2 candidate cells is associated to a priority order.

Specifically, according to one aspect of the disclosure, the first transmitter transmits third information, the third information is used for indicating a first time set, time values in the first time set are associated to the K2 candidate cells, the first time set includes a first time value, and the first time value is used for indicating a maximum length of service time for which the first node is served by a cell associated to the first time value.

In one embodiment, the first time set includes K2 time values, and the K2 time values are associated to the K2 candidate cells.

In one embodiment, the first time set includes K3 time values, wherein K3 is less than or equal to K2, and the K3 time values are associated to K3 candidate cells among the K2 candidate cells.

In on embodiment, the first time value is one of the K2 time values.

In on embodiment, the first time value is one of the K3 time values.

Specifically, according to one aspect of the disclosure, the first node is a UE.

Specifically, according to one aspect of the disclosure, the first node is an IoT terminal.

Specifically, according to one aspect of the disclosure, the first node is a relay.

Specifically, according to one aspect of the disclosure, the first node is a vehicle terminal.

Specifically, according to one aspect of the disclosure, the first node is an air vehicle.

The disclosure provides a method in a second node for wireless communication, wherein the method includes:
  transmitting a first signaling, the first signaling including a first identifier and a second identifier; and
  receiving a first signal.

Herein, the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

Specifically, according to one aspect of the disclosure, the first signal is used for determining K2 candidate cells, and the target cell is one of the K2 candidate cells.

Specifically, according to one aspect of the disclosure, the first signaling includes a third identifier, a cell to which the first node is attached is the first cell among the K1 cells, the third identifier is used for identifying the first cell among the K1 cells; and the third identifier is different from the first identifier.

Specifically, according to one aspect of the disclosure, a second signal is transmitted in a third time-frequency resource set.

Herein, the second time-frequency resource set is used for determining the third time-frequency resource set; whether the second signal includes the second identifier is used for determining whether a transmitter of the second signal receives the first signal.

Specifically, according to one aspect of the disclosure, a second signal is transmitted in a third time-frequency resource set.

Herein, the target cell is used for determining the third time-frequency resource set; whether the second signal includes the second identifier is used for determining whether a transmitter of the second signal receives the first signal.

Specifically, according to one aspect of the disclosure, the first signal is used for indicating second information, and the second information is used for indicating priorities of the K2 candidate cells.

Specifically, according to one aspect of the disclosure, third information is received, wherein the third information is used for indicating a first time set, time values in the first time set are associated to the K2 candidate cells, the first time set includes a first time value, and the first time value is used for indicating a maximum length of service time for which the first node is served by a cell associated to the first time value.

Specifically, according to one aspect of the disclosure, the second node is a base station.

Specifically, according to one aspect of the disclosure, the second node is a relay.

Specifically, according to one aspect of the disclosure, the second node is a vehicle terminal.

Specifically, according to one aspect of the disclosure, the second node is an air vehicle.

Specifically, according to one aspect of the disclosure, the second node is a group header.

Specifically, according to one aspect of the disclosure, the second node is a satellite.

The disclosure provides a first node for wireless communication, wherein the first node includes:
   a first receiver, to receive a first signaling, the first signaling including a first identifier and a second identifier; and
   a first transmitter, to transmit a first signal.

Herein, the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

The disclosure provides a second node for wireless communication, wherein the second node includes:
   a second transmitter, to transmit a first signaling, the first signaling including a first identifier and a second identifier; and
   a second receiver, to receive a first signal.

Herein, the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, compared with conventional schemes, the disclosure has the following benefits.

In the condition that a long communication distance and a high transmission latency exist between a UE and a serving cell, or a UE or a base station moves fast, especially in satellite communication, if according to conventional schemes, when a random access feedback signal transmitted by a base station reaches where a user initiates a random access, the user probably has moved out of the original cell, which might lead to access failure; on the other hand, due to the long transmission latency, the user probably cannot tolerate too many failures of access; therefore, it is an urgent need to establish a more effective mechanism such that a UE can access a network more reliably or a UE can access a network with a high probability after a few number of access attempts; on the other hand, due to a long propagation time during communication, a measurement by a user cannot be reported to a base station timely, thus the base station cannot know the location of the user accurately, which leads to inconsistency between transmitting and receiving. In the disclosure, a cell group including multiple cells is designed, which performs random access using a same resource, and the base station actually responsible for receiving and processing a user signal is determined through the information provided by the user, thus the success rate of access is improved, the robustness of system is enhanced, and the impact of mobility on the high latency network is reduced.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
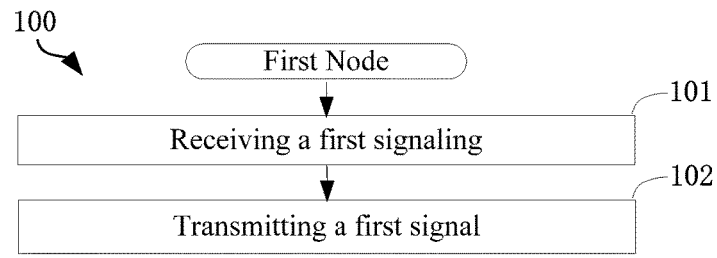
FIG. 1 is a flowchart of receiving a first signaling and transmitting a first signal according to one embodiment of the disclosure.

Embodiment 1 illustrates a flowchart of receiving a first signaling and transmitting a first signal according to one embodiment of the disclosure, as shown in FIG. 1. In FIG. 1, each box represents one step, and it should be noted that the order of the boxes in FIG. 1 does not represent a time sequence of the steps represented by the boxes.

In Embodiment 1, the first node in the disclosure receives a first signaling in S101, and transmits a first signal in S102; wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, the first node is a UE (User Equipment).

In one embodiment, the first signaling is transmitted on a PDSCH.

In one embodiment, the first signaling is transmitted on a Physical Downlink Control Channel (PDCCH).

In one embodiment, the first signaling is transmitted on a Physical Sidelink Broadcast Channel (PSBCH).

In one embodiment, the first signaling is configured through one cell belonging to the first cell group.

In one embodiment, the first cell group belongs to one same system information area.

In one embodiment, the first cell group belongs to different system information areas.

In one embodiment, the first time-frequency resource set includes an Random Access Occasion (RO).

In one embodiment, the first signaling indicates explicitly the first time-frequency resource set.

In one embodiment, the first signaling indicates multiple subbands, and time-frequency resources of each subband included in the first time-frequency resource unit are associated mutually.

In one embodiment, the first signaling indicates one index, and the one index indicates the first time-frequency resource set in a predefined table.

In one embodiment, the first signaling indicates explicitly the second time-frequency resource set.

In one embodiment, the first signaling indicates multiple subbands, and time-frequency resources of each subband included in the second time-frequency resource unit are associated mutually.

In one embodiment, the first signaling indicates one index, and the one index indicates the second time-frequency resource set in a predefined table.

In one embodiment, the first time-frequency resource set and the second time-frequency resource set have an association relationship in time or frequency, and, through indicating one of the time-frequency resource sets, the first signaling indicates implicitly the other time-frequency resource set.

In one embodiment, the first signaling indicates the condition under which the first node selects the first time-frequency resource set or the second time-frequency resource set, and the condition includes the following:
  in one embodiment, the location of the first node;
  in one embodiment, a channel quality measurement result performed by the first node;
  in one embodiment, the type of the first node;
  in one embodiment, the capability of the first node;
  in one embodiment, the time the first node initiates a random process; and
  in one embodiment, whether the first node has a positioning capability.

In one embodiment, when the first node chooses to transmit the first signal in the second time-frequency resource set, the first node terminates the random access process initiated in the first time-frequency resource set.

In one embodiment, when the first node generates the first signal using the second identifier, the first signal is transmitted in the second time-frequency resource set.

In one embodiment, the first signal includes a preamble.

In one embodiment, the first signal is transmitted on a PRACH.

In one embodiment, the first signal includes data.

In one embodiment, the first signal is transmitted on a PUSCH.

In one embodiment, the first signal is transmitted on a PUCCH.

In one embodiment, the first signal is transmitted on a configured uplink resource.

In one embodiment, the first signal includes a first sub-signal and a second sub-signal, the first sub-signal is transmitted on a PRACH, and the second sub-signal is transmitted on a PUSCH.

In one embodiment, the first identifier includes one cell, and the second identifier includes multiple cells.

In one embodiment, the first identifier is used for determining time-frequency resources within one cell, and the second identifier is used for determining time-frequency resources within multiple cells.

In one embodiment, the first time-frequency resource set and the second time-frequency resource set are orthogonal.

In one embodiment, the second identifier is explicitly associated to the K1 cells.

In one embodiment, the K1 cells in the first cell group are contained by a neighbor cell list.

In one embodiment, the K1 cells in the first cell group are determined by the system information area.

In one embodiment, the K1 cells in the first cell group belong to one same tracking area.

In one embodiment, the target cell is not the first cell.

In one embodiment, the second signal is used for feeding back the first signal.

In one embodiment, the target cell is contained in the K2 candidate cells, and a receiver of the first signal determines the target cell among the K2 candidate cells.

In one embodiment, after the second signal is received, the target cell is determined by the first node as a cell to attach.

In one embodiment, the second signal carries uplink resource assignment information.

In one embodiment, the second signal carries timing advance information.

In one embodiment, K2 is less than or equal to K1.

In one embodiment, K2 is equal to 1.

In one embodiment, K2 is less than or equal to 2.

In one embodiment, K2 is less than or equal to 3.

In one embodiment, K2 is less than or equal to 8.

In one embodiment, the first signaling indicates a maximum value of the K2.

In one embodiment, the third identifier is partial bits of the first identifier.

In one embodiment, the third identifier indicates one bitmap, and the bitmap is used for determining the K2 candidate cells from the first group cell of K1 cells.

Embodiment 2

Figure 2:
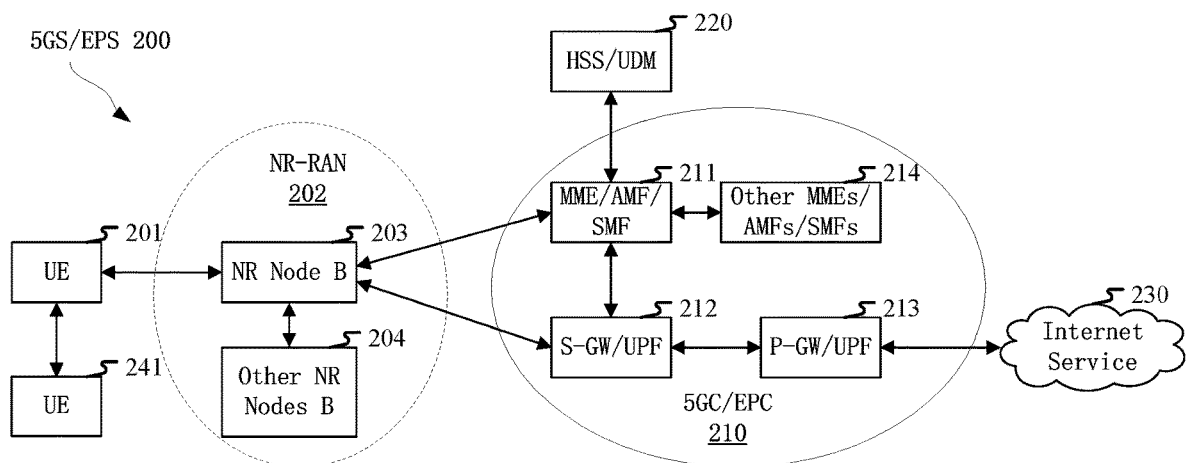
FIG. 2 is a diagram illustrating a network architecture according to one embodiment of the disclosure.

Embodiment 2 illustrates a diagram of a network architecture according to the disclosure, as shown in FIG. 2.

FIG. 2 is a diagram illustrating a network architecture 200 of 5G NR, Long-Term Evolution (LTE), Long-Term Evolution Advanced (LTE-A) systems. The 5G NR or LTE network architecture 200 may be called a 5G System (5GS)/Evolved Packet System (EPS) 200 or some other appropriate terms. The 5GS/EPS 200 may include one or more UEs 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS may be interconnected with other access networks. For simple description, the entities/interfaces are not shown. As shown in FIG. 2, the 5GS/EPS provides packet switching services. Those skilled in the art are easy to understand that various concepts presented throughout the present disclosure may be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be called a base station, a base transceiver station, a radio base station, a radio transceiver, a transceiver function, a Basic Service Set (BSS), an Extended Service Set (ESS), a Transmitter Receiver Point (TRP) or some other appropriate terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistants (PDAs), Satellite Radios, non-terrestrial base station communications, satellite mobile communications, Global Positioning Systems (GPSs), multimedia devices, video devices, digital audio player (for example, MP3 players), cameras, games consoles, unmanned air-interface vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 includes a Mobility Management Entity/Authentication Management Field/Session Management Function (MME/AMF/SMF) 211, other MMEs/AMFs/SMFs 214, a Service Gateway/User Plane Function (S-GW/UPF) 212 and a Packet Data Network Gateway/UPF (P-GW/UPF) 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet service 230. The Internet service 230 includes IP services corresponding to operators, specifically including Internet, Intranet, IP Multimedia Subsystems (IMSs) and Packet Switching Streaming Services (PSSs).

In one embodiment, the UE 201 corresponds to the first node in the disclosure.

In one embodiment, the UE 201 supports transmission in an NTN.

In one embodiment, the UE 201 supports transmission in a large-latency network.

In one embodiment, the UE 201 supports V2X transmission.

In one embodiment, the gNB 203 corresponds to the second node in the disclosure.

In one embodiment, the gNB 203 supports transmission in an NTN.

In one embodiment, the gNB 203 supports transmission in a large-latency network.

In one embodiment, the gNB 203 supports V2X transmission.

Embodiment 3

Figure 3:
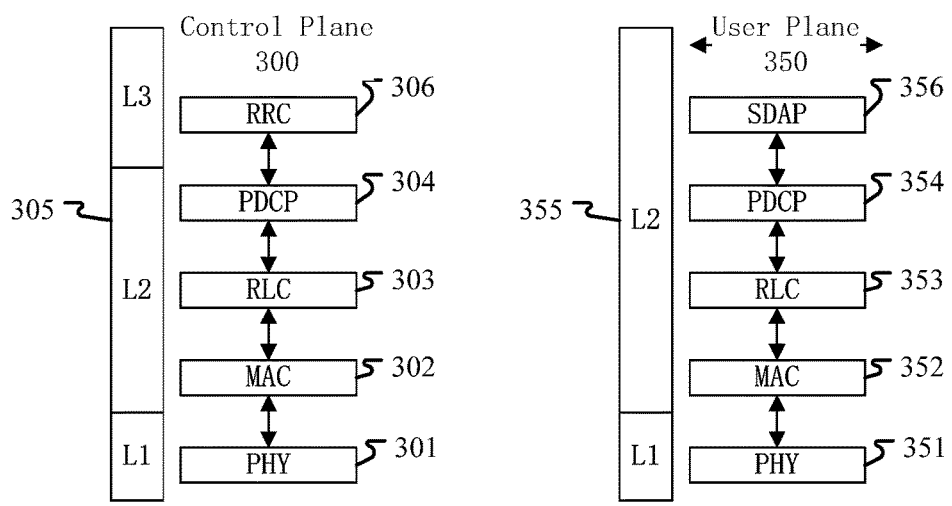
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first node (UE, gNB or satellite or air vehicle in NTN) and a second node (gNB, UE or satellite or air vehicle in NTN) or between two UEs is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first node and the second node and between two UEs over the PHY 301. The L2 Layer 305 includes a Medium Access Control (MAC) sublayer 302, a Radio Link Control (RLC) sublayer 303, and a Packet Data Convergence Protocol (PDCP) sublayer 304, which are terminated at the second node. The PDCP sublayer 304 provides multiplexing between different radio bearers and logical channels. The PDCP sublayer 304 also provides security by encrypting packets and provides support for handover of the first node between second nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first node. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second node and the first node. The radio protocol architecture of the user plane 350 includes a Layer 1 (L1 layer) and a Layer 2 (L2 layer); the radio protocol architecture for the first node and the second node in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first node may include several higher layers above the L2 Layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first signaling in the disclosure is generated on the PHY 301 or MAC 302 or RRC 306.

In one embodiment, the first signal in the disclosure is generated on the PHY 301 or MAC 302 or RRC 306.

In one embodiment, the second signal in the disclosure is generated on the PHY 301 or MAC 302 or RRC 306.

In one embodiment, the third information in the disclosure is generated on the PHY 301 or MAC 302 or RRC 306.

Embodiment 4

Figure 4:
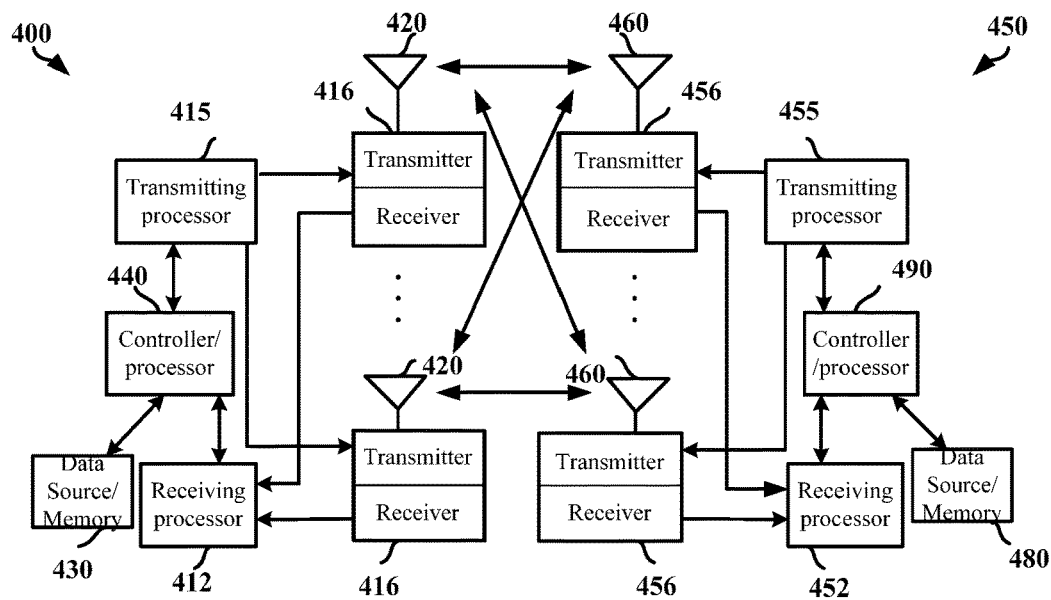
FIG. 4 is a diagram illustrating a first node and a second node according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first signaling, the first signaling including a first identifier and a second identifier, and transmits a first signal; wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, the first communication equipment 450 includes a memory that stores a computer readable instruction program. The computer readable instruction program generates an action when executed by at least one processor. The action includes: receiving a first signaling, the first signaling including a first identifier and a second identifier, and transmitting a first signal; wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first signaling, the first signaling including a first identifier and a second identifier; and receives a first signal; wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group comprises K1 cells, and the K1 is a positive integer greater than 1; the first signal is used for determining a target cell, the target cell is one of the K1 cells, and the first cell is one cell in the first cell group.

In one embodiment, the second communication equipment 410 includes a memory that stores a computer readable instruction program. The computer readable instruction program generates an action when executed by at least one processor. The action includes: transmitting a first signaling, the first signaling including a first identifier and a second identifier; and receiving a first signal; wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group comprises K1 cells, and the K1 is a positive integer greater than 1; the first signal is used for determining a target cell, the target cell is one of the K1 cells, and the first cell is one cell in the first cell group.

In one embodiment, the first communication equipment 450 corresponds to the first node in the disclosure.

In one embodiment, the second communication equipment 410 corresponds to the second node in the disclosure.

In one embodiment, the first communication equipment 450 is one UE.

In one embodiment, the first communication equipment 450 is one vehicle terminal.

In one embodiment, the second communication equipment 410 is one base station.

In one embodiment, the second communication equipment 410 is one UE.

In one embodiment, the second communication equipment 410 is one satellite.

In one embodiment, the receiver 456 (including antenna 460), the receiving processor 452 and the controller/processor 490 are used for receiving the first signaling in the disclosure.

In one embodiment, the receiver 456 (including antenna 460), the receiving processor 452 and the controller/processor 490 are used for receiving the second signal in the disclosure.

In one embodiment, the transmitter 456 (including antenna 460), the transmitting processor 455 and the controller/processor 490 are used for transmitting the first signal in the disclosure.

In one embodiment, the transmitter 456 (including antenna 460), the transmitting processor 455 and the controller/processor 490 are used for transmitting the third information in the disclosure.

In one embodiment, the transmitter 416 (including antenna 420), the transmitting processor 412 and the controller/processor 440 are used for transmitting the first signaling in the disclosure.

In one embodiment, the transmitter 416 (including antenna 420), the transmitting processor 412 and the controller/processor 440 are used for transmitting the second signal in the disclosure.

In one embodiment, the receiver 416 (including antenna 420), the receiving processor 412 and the controller/processor 440 are used for receiving the first signal in the disclosure.

In one embodiment, the receiver 416 (including antenna 420), the receiving processor 412 and the controller/processor 440 are used for receiving the third information in the disclosure.

Embodiment 5

Figure 5:
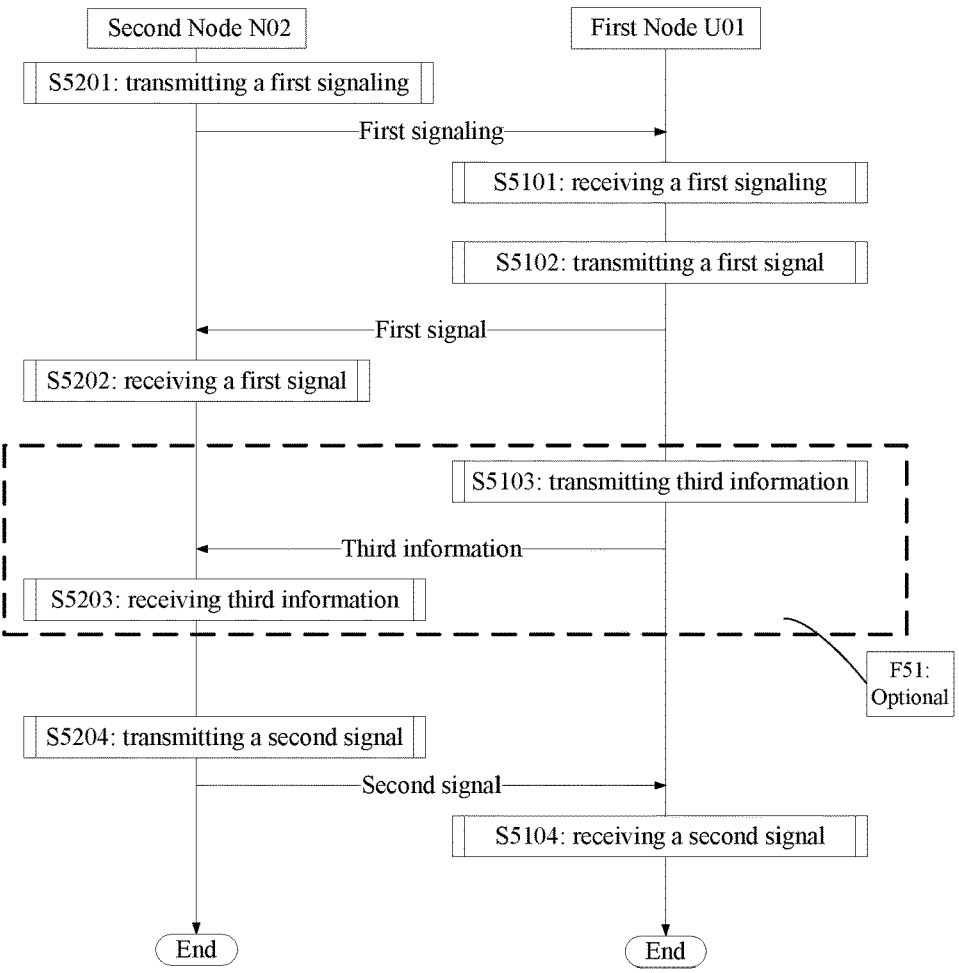
FIG. 5 is a flowchart of transmission according to one embodiment of the disclosure.

Embodiment 5 illustrates a flowchart of transmission of a radio signal according to one embodiment of the disclosure, as shown in FIG. 5. In FIG. 5, a second node N02 is a base station of a serving cell for a first node U01; in particular, the order in this example does not limit the order of transmission and implementation of the signal in the disclosure.

The second node N02 transmits a first signaling in S5201.

The first node U01 receives a first signaling in S5101, and transmits a first signal in S5102.

In Embodiment 5, the first signaling in the disclosure is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, a communication interface between the first node U01 and the second node N02 is a Uu interface.

In one embodiment, a communication interface between the first node U01 and the second node N02 is a PC5 interface.

In one embodiment, the first signaling is one RRC signaling.

In one embodiment, the first signaling is one MAC CE signaling.

In one embodiment, the first signaling is one Downlink Control Information (DCI) signaling.

In one embodiment, the first signaling is one Sidelink Control Information (SCI) signaling.

In one embodiment, the first signaling includes a Random access configuration message, and the first signaling includes a PRACH Configuration Index.

In one embodiment, the first signaling includes a Physical Random Access Channel Configuration Index (PRACH Configuration Index).

In one embodiment, the first time-frequency resource set includes time-frequency resources for random access, and the configuration mode of the first time-frequency resource set includes using a random access configuration signaling.

In one embodiment, the second time-frequency resource set includes time-frequency resources for random access, and the configuration mode of the second time-frequency resource set includes using a random access configuration signaling.

In one embodiment, the first signaling is transmitted on a Physical Sidelink Control Channel (PSCCH).

In one embodiment, the first signaling is transmitted on a Physical Sidelink Shared Channel (PSSCH).

In one embodiment, the first signaling is used for configuring the first time-frequency resource set explicitly.

In one embodiment, the first signaling is used for configuring the second time-frequency resource set explicitly.

In one embodiment, the first cell is a cell selected by the first node.

In one embodiment, the second identifier includes a virtual cell identifier.

In one embodiment, the second identifier is associated to cell identifiers of cells in the first cell group.

In one embodiment, the second node N02 receives the first signal in S5202.

In one embodiment, the first signal is used for determining a target cell.

In one embodiment, the first signal is used for determining K2 candidate cells, and the target cell is one of the K2 candidate cells.

In one embodiment, the K2 candidate cells are adjacent cells.

In one embodiment, the K2 candidate cells belong to one same base station.

In one embodiment, the first signaling includes a third identifier, a cell to which the first node is attached is the first cell among the K1 cells, the third identifier is used for identifying the first cell among the K1 cells; and the third identifier is different from the first identifier.

In one embodiment, the first identifier is a PCI, and the third identifier is a beam index.

In one embodiment, the first identifier is an NCGI, and the third identifier is a PCI.

In one embodiment, the third identifier is an index of the first cell in the first cell group.

In one embodiment, the first cell is a cell to which the first node selects to initiate an attach process.

In one embodiment, the third identifier is one part of the second identifier.

In one embodiment, the first node U01 transmits third information in S5103.

In one embodiment, the second node N02 receives the third information in S5202.

In one embodiment, the third information is used for indicating a first time set, time values in the first time set are associated to the K2 candidate cells, the first time set includes a first time value, and the first time value is used for indicating a maximum length of service time for which the first node is served by a cell associated to the first time value.

In one embodiment, the first time set includes K2 time values.

In one embodiment, the first time set includes less than K2 time values.

In one embodiment, each time value included in the first time set is corresponding to one cell among the K2 candidate cells, and each time value is used for indicating a maximum length of service time for which the first node is served by a candidate cell among the K2 candidate cells that is associated to the time value.

In one embodiment, the first time set includes a second time value, a cell associated to the second time value belongs to the K2 candidate cells, a cell associated to the second time value is different from a cell associated to the first time value, and the second time value is used for indicating a maximum length of service time for which the first node is served by a candidate cell associated to the second time value.

In one embodiment, the first time set includes a third time value and a fourth time value, and the third time value is equal to the fourth time value.

In one embodiment, the first time set and the second information are used together for determining the target cell.

In one embodiment, the first time set is used for determining the target cell.

In one embodiment, time values in the first time set are in unit of millisecond.

In one embodiment, time values in the first time set are in unit of second.

In one embodiment, time values in the first time set are in unit of subframe.

In one embodiment, time values in the first time set are in unit of frame.

In one embodiment, time values in the first time set are in unit of superframe.

In one embodiment, time values in the first time set have a unit specified by the serving cell.

In one embodiment, the serving cell of the first node configures a maximum time value of the time values in the first time set.

In one embodiment, when there is one cell among the K2 cells not associated to a time value in the first time set, the maximum length of time for which the first node is served by this cell is determined implicitly as the maximum time value of the time values in the first time set.

In one embodiment, the maximum length of time for which the first node is served by a cell associated to a time value in the first time set is related to a transmitting order of the time value in the first time set.

In one embodiment, the first time set has K3 time values, which are respectively:

$$\{T_1, T_2, \ldots, T_i, T_{i+1}, \ldots, T_{K3}\}$$

where K3 is a positive integer, and the ith time value $T_i$ indicates the maximum length of time for which the first node is served by the cell associated to the ith time value:

$$T=\Sigma_{j=1}^{i}T_j$$

In one embodiment, time values in the first time set are positive integers.

In one embodiment, time values in the first time set are positive numbers.

In one embodiment, time values in the first time set are fractions.

In one embodiment, time values in the first time set that are associated to the K2 candidate cells are all equal.

In one embodiment, sizes of time values in the first time set that are associated to the K2 candidate cells are related to channel qualities of the K2 candidate cells measured by the first node in size.

In one embodiment, time values in the first time set are related to a data amount of the first node.

In one embodiment, time values in the first time set are related to the service of the first node.

In one embodiment, time values in the first time set are related to a reason for the random access of the first node.

In one embodiment, the second node N02 transmits a second signal in S5204.

In one embodiment, the first node U01 receives the second signal in S5104.

In one embodiment, the second signal is transmitted in the third time-frequency resource set.

In one embodiment, time-frequency resources occupied by the second signal belong to the third time-frequency resource set.

In one embodiment, the second signal includes an RAR.

In one embodiment, the second signal includes a DCI.

In one embodiment, the second signal is transmitted on a PDCCH.

In one embodiment, the second signal is transmitted on a PDSCH.

In one embodiment, the second signal is transmitted on a Physical Sidelink Control Channel (PSCCH).

In one embodiment, the second signal is transmitted on a Physical Sidelink Shared Channel (PSSCH).

In one embodiment, the second signal is used for feeding back the first signal.

In one embodiment, the second signal is transmitted by the target cell.

In one embodiment, the second signal is forwarded by the first cell.

In one embodiment, the first signal is used for indicating second information, and the second information is used for indicating priorities of the K2 candidate cells.

In one embodiment, priorities of the candidate cells are used for determining the target cell among the K2 candidate cells.

In one embodiment, when the priority of a candidate cell is lower than a specific threshold, the candidate cell is not determined as the target cell.

In one embodiment, the second node is the first cell.

In one embodiment, the second node is the first cell group.

In one embodiment, the second node is the target cell.

In one embodiment, the second node includes the first cell and the target cell.

Embodiment 6

Figure 6:
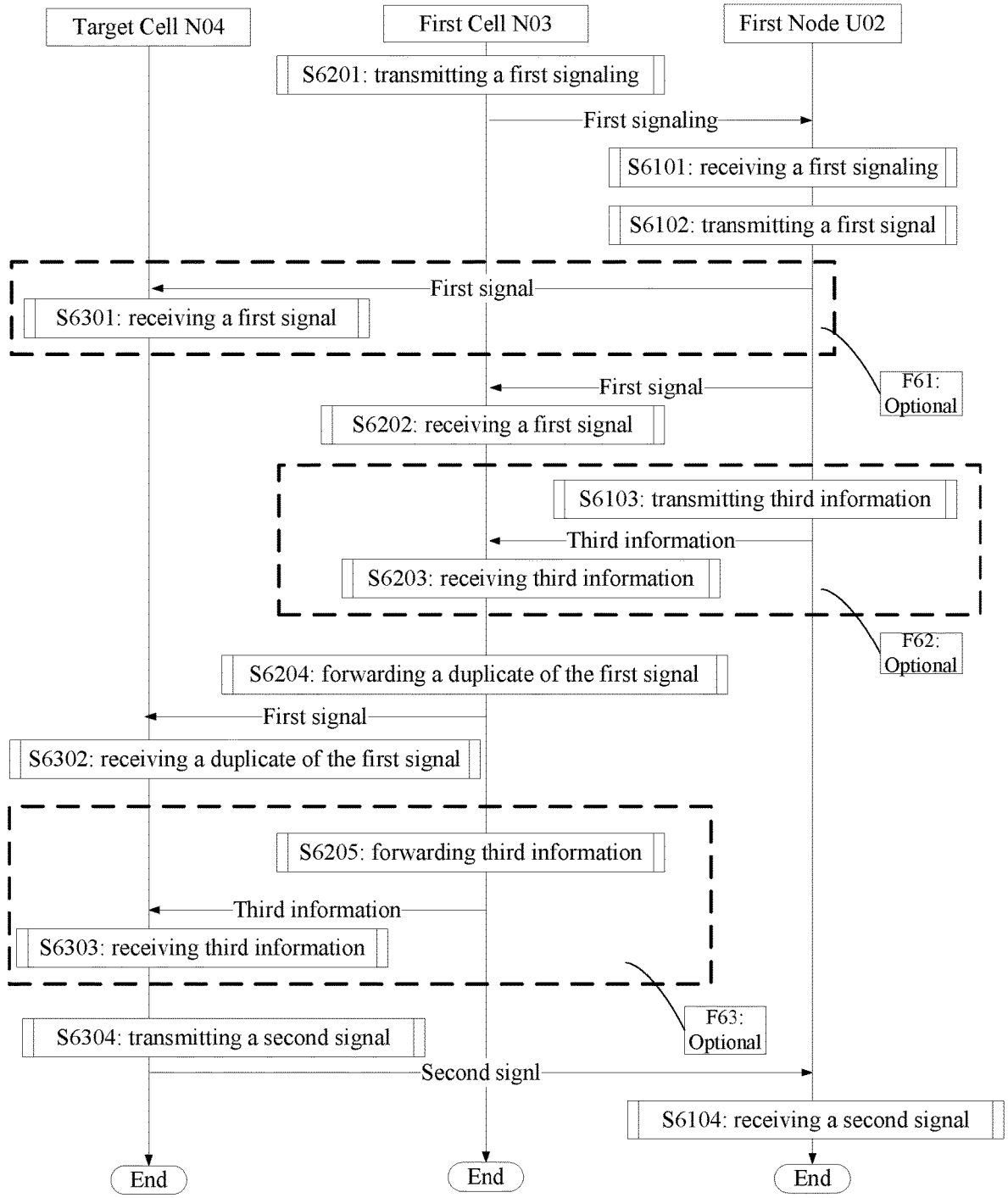
FIG. 6 is a flowchart of transmission according to one embodiment of the disclosure.

Embodiment 6 illustrates a flowchart of transmission of a radio signal according to one embodiment of the disclosure, as shown in FIG. 6. In FIG. 6, a first cell N03 is a serving cell base station of a first node U02, a target cell is N04; in particular, the order in this example does not limit the order of transmission and implementation of the signal in the disclosure.

A second node N03 transmits a first signaling in S6201.

The first node U02 receives a first signaling in S6101, and transmits a first signal in S6102.

In Embodiment 6, the first signaling in the disclosure is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, a communication interface between the first node U02 and the first cell N03 is a Uu interface.

In one embodiment, a communication interface between the first node U02 and the first cell N03 is a PC5 interface.

In one embodiment, a communication interface between the first node U02 and the target cell N04 is a Uu interface.

In one embodiment, a communication interface between the first node U02 and the target cell N04 is a PC5 interface.

In one embodiment, the first cell is one NTN cell, and the target cell is one TN cell.

In one embodiment, the first cell is one TN cell, and the target cell is one NTN cell.

In one embodiment, the first signal is directly received by the target cell N04 in S6301.

In one embodiment, the target cell N04 does not detect the first signal directly.

In one embodiment, the first signal is used for determining K2 candidate cells, and the target cell is one of the K2 candidate cells.

In one embodiment, the first signaling includes a third identifier, a cell to which the first node is attached is the first cell among the K1 cells, the third identifier is used for identifying the first cell among the K1 cells; and the third identifier is different from the first identifier.

In one embodiment, the first signal is used for indicating second information, and the second information is used for indicating priorities of the K2 candidate cells.

In one embodiment, the first signal includes identifiers of the K2 candidate cells.

In one embodiment, the first cell determines the target cell.

In one embodiment, the first signal indicates the target cell.

In one embodiment, a cell with a highest priority in the first signal is determined as the target cell.

In one embodiment, a cell with a maximum length of service time in the first signal is determined as the target cell.

In one embodiment, a cell with a minimum length of service time in the first signal is determined as the target cell.

In one embodiment, the first node U02 transmits third information in S6103, the third information is used for indicating a first time set, time values in the first time set are associated to the K2 candidate cells, the first time set includes a first time value, and the first time value is used for indicating a maximum length of service time for which the first node is served by a cell associated to the first time value.

In one embodiment, the first cell N03 receives the third information in S6203.

In one embodiment, the first cell determines the target cell among the K2 candidate cells according to the third information.

In one embodiment, the first cell determines a cell among the K2 candidate cells that is associated to a maximum time value as the target cell.

In one embodiment, the first cell determines a cell among the K2 candidate cells that is associated to a minimum time value as the target cell.

In one embodiment, the first cell forwards, in S6204, a duplicate of the first signal received in S6202 to the determined target cell N04.

In one embodiment, the target cell receives a duplicate of the first signal in S6302.

In one embodiment, the target cell combines the duplicate of the first signal received in S6302 with the first signal directly received in S6301.

In one embodiment, the target cell compares the duplicate of the first signal received in S6302 with the first signal directly received in S6301 and chooses one.

In one embodiment, the first cell N03 forwards the third information to the target cell N04 in S6205.

In one embodiment, the target cell N04 receives, in S6303, the third information forwarded by the first cell N03.

In one embodiment, an interface between the first cell N03 and the target cell N04 is X2.

In one embodiment, an interface between the first cell N03 and the target cell N04 is Xn.

In one embodiment, an interface between the first cell N03 and the target cell N04 is PC5.

In one embodiment, the target cell N04 transmits a second signal in S6304.

In one embodiment, the first node U02 receives the second signal in S6104.

In one embodiment, the first node U02 receives a second signal in a third time-frequency resource set; the target cell is used for determining the third time-frequency resource set; whether the second signal includes the second identifier is used for determining whether a transmitter of the second signal receives the first signal.

In one embodiment, the first node U02 receives a second signal in a third time-frequency resource set; the target cell is used for determining the third time-frequency resource set; whether the second signal includes the second identifier is used for determining whether a transmitter of the second signal receives the first signal.

In one embodiment, the third time-frequency resource set is determined by the target cell N04.

In one embodiment, the third time-frequency resource set belongs to the target cell N04.

In one embodiment, the third time-frequency resource set is associated to the target cell N04.

In one embodiment, an identifier of the target cell N04 is used for generating data transmitted in the third time-frequency resource set.

In one embodiment, time-frequency resources which are indicated by resource assignment information included in the second signal transmitted in the third time-frequency resource set belong to the target cell N04.

In one embodiment, the second signal transmitted in the third time-frequency resource set carries an identifier of the target cell N04.

Embodiment 7

Figure 7:
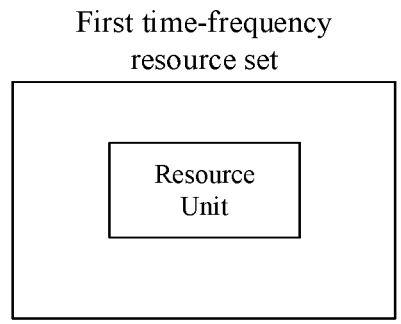
FIG. 7 is a diagram illustrating a first time-frequency resource set according to one embodiment of the disclosure.

Embodiment 7 illustrates a diagram of a first time-frequency resource set according to one embodiment of the disclosure, as shown in FIG. 7. In Embodiment 7, the first time-frequency resource set includes at least one resource unit.

In one embodiment, the first signaling indicates the first time-frequency resource set.

In one embodiment, the first identifier is associated to the first time-frequency resource set.

In one embodiment, the first time-frequency resource set belongs to the first cell.

In one embodiment, the first time-frequency resource set is used for 2 step RACH.

In one embodiment, the first node determines a time-frequency resource set used by an uplink random access signal transmitted by the first node, using a geographic position.

In one embodiment, when the first node is at the edge of the cell, the first node selects the second time-frequency resource set to transmit a random access request signal.

In one embodiment, when the first node is at the center of the cell, the first node selects the first time-frequency resource set to transmit a random access request signal.

In one embodiment, when a TA determined by the first node is greater than a threshold, the first node selects the second time-frequency resource set to transmit a random access request signal.

In one embodiment, when the first node initiates a random access due to beam failure recovery, the first node selects to transmit a random access request signal in the second time-frequency resource set.

In one embodiment, the first time-frequency resource set and the second time-frequency resource set are orthogonal.

In one embodiment, the resource unit is one RE.

Embodiment 8

Figure 8:
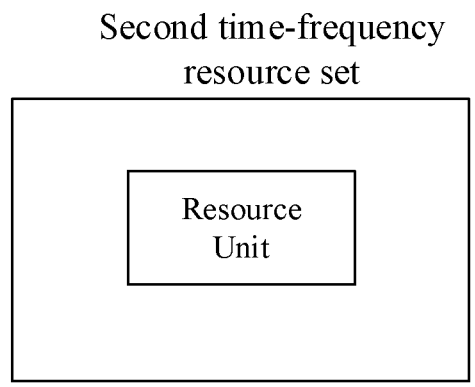
FIG. 8 is a diagram illustrating a second time-frequency resource set according to one embodiment of the disclosure.

Embodiment 8 illustrates a diagram of a second time-frequency resource set according to one embodiment of the disclosure, as shown in FIG. 8. In Embodiment 8, the second time-frequency resource set includes at least one resource unit.

In one embodiment, the first signaling indicates the second time-frequency resource set.

In one embodiment, the second identifier is associated to the second time-frequency resource set.

In one embodiment, the second time-frequency resource set belongs to the first cell group.

In one embodiment, the second time-frequency resource set belongs to each cell in the first cell group.

In one embodiment, any cell in the first cell group detects a random access request signal transmitted in the second time-frequency resource set.

In one embodiment, the second time-frequency resource set is used for 2 step RACH.

In one embodiment, the first node determines a time-frequency resource set used by an uplink random access signal transmitted by the first node, using a geographic position.

In one embodiment, when the first node is at the edge of the cell, the first node selects the second time-frequency resource set to transmit a random access request signal.

In one embodiment, when a TA determined by the first node is greater than a threshold, the first node selects the second time-frequency resource set to transmit a random access request signal.

In one embodiment, when the first node initiates a random access due to beam failure recovery, the first node selects to transmit a random access request signal in the second time-frequency resource set.

In one embodiment, the first time-frequency resource set and the second time-frequency resource set are orthogonal.

In one embodiment, the resource unit is one RE.

Embodiment 9

Figure 9:
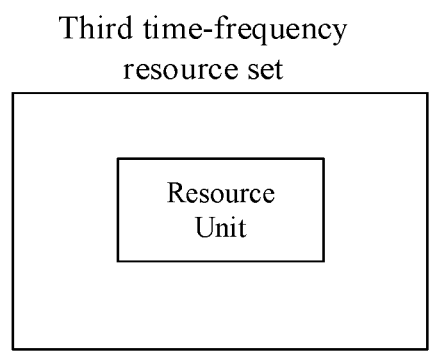
FIG. 9 is a diagram illustrating a third time-frequency resource set according to one embodiment of the disclosure.

Embodiment 9 illustrates a diagram of a third time-frequency resource set according to one embodiment of the disclosure, as shown in FIG. 9. In Embodiment 9, the third time-frequency resource set includes at least one resource unit.

In one embodiment, the second signal is transmitted in the third time-frequency resource set.

In one embodiment, the third time-frequency resource set is used for 2 step RACH.

In one embodiment, the third time-frequency resource set is assigned by the target cell.

In one embodiment, the third time-frequency resource set is indicated by the first cell.

In one embodiment, the third time-frequency resource set is indicated by the first cell through a DCI, and the assignment of the third time-frequency resources is controlled by the target cell.

In one embodiment, the third time-frequency resources are associated to the second identifier.

In one embodiment, the third time-frequency resources are associated to the first cell group.

In one embodiment, the third time-frequency resources are associated to the K2 candidate cells.

In one embodiment, the third time-frequency resources are associated to a virtual identifier.

In one embodiment, the second time-frequency resource set is used for determining the third time-frequency resource set; whether the second signal includes the second identifier is used for determining whether a transmitter of the second signal receives the first signal.

In one embodiment, the target cell is used for determining the third time-frequency resource set; whether the second signal includes the second identifier is used for determining whether a transmitter of the second signal receives the first signal.

In one embodiment, the second time-frequency resource set is mapped to the third time-frequency resource set.

In one embodiment, the second time-frequency resource set and the third time-frequency resource set are associated to a same SSB.

Embodiment 10

Figure 10:
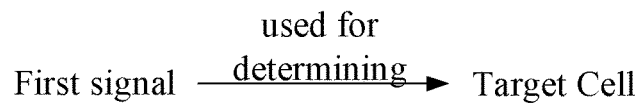
FIG. 10 is a diagram illustrating a scenario in which a first signal is used for determining a target cell according to one embodiment of the disclosure.

Embodiment 10 illustrates a diagram of a scenario in which a first signal is used for determining a target cell according to one embodiment of the disclosure, as shown in FIG. 10.

In one embodiment, the first signal indicates an identifier of the target cell.

In one embodiment, the first signal is transmitted in time-frequency resources of the target cell, and the target cell is determined once the target cell detects the first signal.

In one embodiment, the first signal carries K2 candidate cells, and the target cell belongs to the K2 candidate cells.

In one embodiment, the first signal indicates priorities of the K2 candidate cells, and a cell with a highest priority is determined as the target cell.

In one embodiment, the first signal carries time values, belonging to the first time set, associated to the K2 candidate cells, wherein a candidate cell associated to a maximum time value among the time values is determined as the target cell.

In one embodiment, the first signal carries time values, belonging to the first time set, associated to the K2 candidate cells, wherein a candidate cell associated to a minimum time value among the time values is determined as the target cell.

In one embodiment, the first signal carries time values, belonging to the first time set, associated to the K2 candidate cells, wherein a cell with a highest priority among multiple candidate cells associated to a maximum time value among the time values is determined as the target cell.

In one embodiment, the first signal carries time values, belonging to the first time set, associated to the K2 candidate cells, wherein among cells with a highest priority among the K2 candidate cells, a candidate cell associated to a maximum time value among the time values is determined as the target cell.

In one embodiment, a received power of the first signal is used for determining the target cell.

In one embodiment, among cells that receive the first signal and belong to the first cell group of K1 cells, a cell with a maximum received power is determined as the target cell.

In one embodiment, among cells that receive the first signal and belong to the K2 candidate cells, a cell with a maximum received power is determined as the target cell.

In one embodiment, a receiving delay of the first signal is used for determining the target cell.

In one embodiment, among cells that receive the first signal and belong to the first cell group of K1 cells, a cell with a minimum receiving delay is determined as the target cell.

In one embodiment, among cells that receive the first signal and belong to the K2 candidate cells, a cell with a minimum receiving delay is determined as the target cell.

In one embodiment, a frequency offset of the first signal is used for determining the target cell.

In one embodiment, a receiving frequency offset of the first signal is used for determining a motion direction of the first node relative to the network, the motion direction and the system Round Trip Time (RTT) are used for estimating a position of the first node, and a cell covering the position of the first node is determined as the target cell.

In one embodiment, the first signal carries position information of the user, and the position information is used for determining the target cell.

In one embodiment, the first signal carries position information of the user, the position information is used for estimating a position of the first node, and a cell covering the position of the first node is determined as the target cell.

Embodiment 11

Figure 11:
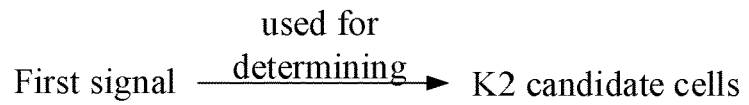
FIG. 11 is a diagram illustrating a scenario in which a first signal is used for determining K2 candidate cells according to one embodiment of the disclosure.

Embodiment 11 illustrates a diagram of a scenario in which a first signal is used for determining K2 candidate cells according to one embodiment of the disclosure, as shown in FIG. 11.

In one embodiment, the first signal indicates explicitly the K2 candidate cells.

In one embodiment, the first signal indicates K2-1 candidate cells, and the first cell is always determined to be one of the K2 candidate cells.

In one embodiment, the first signal indicates K2 cell identifiers.

In one embodiment, the first signal indicates indexes of K2 cells in the first cell group, and the indexes are used for determining the K2 candidate cells.

In one embodiment, a received power of the first signal is used for determining the target cell.

In one embodiment, among all cells that receive the first signal and belong to the first cell group, K2 cells with a maximum received power are determined as the K2 candidate cells.

In one embodiment, a receiving delay of the first signal is used for determining the target cell.

In one embodiment, among cells that receive the first signal and belong to the first cell group of K1 cells, K2 cells with a minimum receiving delay are determined as the K2 candidate cells.

In one embodiment, a frequency offset of the first signal is used for determining the K2 candidate cells.

In one embodiment, a receiving frequency offset of the first signal is used for determining a motion direction of the first node relative to a base station, the motion direction and the RRT of signal are used for estimating a position of the first node, and K2 cells closest to the position are determined as the K2 candidate cells.

In one embodiment, a motion direction and a motion speed of the base station are already known, a motion direction and a motion speed of the first node are already known.

In one embodiment, a motion direction and a motion speed of the base station are already known, the first node is assumed to be stationary.

In one embodiment, the position of the base station is assumed to be stationary, a motion direction and a motion speed of the first node are already known.

In one embodiment, the first signal carries position information of the user, and the position information is used for determining the K2 candidate cells.

In one embodiment, the first signal carries position information of the user, the position information is used for estimating a position of the first node, and K2 cells closest to the position of the first node are determined as the K2 candidate cells.

In one embodiment, the first signal carries position information of the user, the position information is used for estimating a track of the first node, and K2 cells closest to an estimated position of the first node after a specified time are determined as the K2 candidate cells.

In one embodiment, a configuration of a preamble included in the first signal is used for determining the K2 candidate cells.

In one embodiment, the K2 candidate cells include a third cell, and the selection of the third cell does not depend on a measurement result of signal quality.

Embodiment 12

Figure 12:
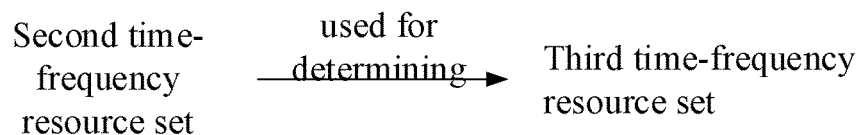
FIG. 12 is a diagram illustrating a scenario in which a second time-frequency resource set is used for determining a third time-frequency resource set according to one embodiment of the disclosure.

Embodiment 12 illustrates a diagram of a scenario in which a second time-frequency resource set is used for determining a third time-frequency resource set according to one embodiment of the disclosure, as shown in FIG. 12.

In one embodiment, the third time-frequency resource set has a mapping relationship with the second time-frequency resource set.

In one embodiment, the third time-frequency resource set is determined by a signal transmitted in the second time-frequency resource set.

In one embodiment, the third time-frequency resource set has a definite relationship in time with the second time-frequency resource set.

In one embodiment, the third time-frequency resource set has a definite relationship in frequency with the second time-frequency resource set.

In one embodiment, signals transmitted in the third time-frequency resource set and the second time-frequency resource set have a mapping relationship in resources occupied.

In one embodiment, the third time-frequency resource set and the second time-frequency resource set are associated to a same SSB.

In one embodiment, the third time-frequency resource set and the second time-frequency resource set are associated to a same reference signal.

In one embodiment, the third time-frequency resource set is mapped to partial time-frequency resources in the second time-frequency resource set.

In one embodiment, the second time-frequency resources and the third time-frequency resources use a same Subcarrier Spacing (SCS).

Embodiment 13

Figure 13:
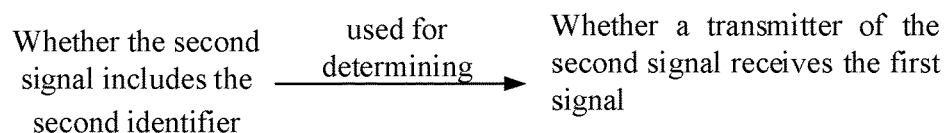
FIG. 13 is a diagram illustrating a scenario in which whether a second signal includes a second identifier is used for determining whether a transmitter of the second signal receives a first signal according to one embodiment of the disclosure.

Embodiment 13 illustrates a diagram of a scenario in which whether a second signal includes a second identifier is used for determining whether a transmitter of the second signal receives a first signal according to one embodiment of the disclosure, as shown in FIG. 13.

In one embodiment, when the second signal includes the second identifier, a transmitter of the second signal is supposed to have received the first signal.

In one embodiment, when the second signal does not include the second identifier, a transmitter of the second signal is not supposed to have received the first signal.

In one embodiment, when the second signal includes a Random Access Preamble ID (RAPID) associated to the second identifier, a transmitter of the second signal is supposed to have received the first signal.

In one embodiment, when the second signal does not include a RAPID associated to the second identifier, a transmitter of the second signal is not supposed to have received the first signal.

In one embodiment, when the second signal is scrambled with a scrambling code related to the second identifier, a transmitter of the second signal is supposed to have received the first signal.

In one embodiment, when the second signal is scrambled with a scrambling code unrelated to the second identifier, a transmitter of the second signal is not supposed to have received the first signal.

In one embodiment, a transmitter of the second signal directly receives the first signal.

In one embodiment, a transmitter of the second signal receives the first signal or a duplicate of the first signal through the forwarding by other nodes.

In one embodiment, when the second signal is transmitted in time-frequency resources determined by the second identifier, a transmitter of the second signal is supposed to have received the first signal.

In one embodiment, when the second signal is transmitted in time-frequency resources unrelated to the second identifier, a transmitter of the second signal is not supposed to have received the first signal.

In one embodiment, when a transmitter of the second signal is supposed to have received the first signal, the transmitter of the second signal is determined as the target cell.

In one embodiment, a direct receiving cell of the first signal is different from a transmitter of the second signal.

Embodiment 14

Figure 14:
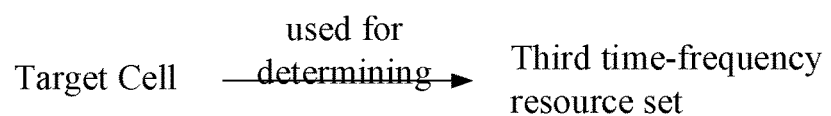
FIG. 14 is a diagram illustrating a scenario in which a target cell is used for determining a third time-frequency resource set according to one embodiment of the disclosure.

Embodiment 14 illustrates a diagram of a scenario in which a target cell is used for determining a third time-frequency resource set according to one embodiment of the disclosure, as shown in FIG. 14.

In one embodiment, an identifier of the target cell is used for determining configuration information of the third time-frequency resource set.

In one embodiment, the third time-frequency resource set belongs to the target cell.

In one embodiment, the third time-frequency resource set is associated to the target cell.

In one embodiment, the third time-frequency resource set is determined by the target cell.

In one embodiment, the third time-frequency resource set is associated to an identifier of the target cell.

In one embodiment, a signal transmitted in the third time-frequency resource set uses a scrambling code that is generated by an identifier of the target cell.

In one embodiment, the second time-frequency resource set is shared by the first cell group, and the third time-frequency resource set belongs to the target cell only.

In one embodiment, the second time-frequency resource set is shared by the first cell group, a time-frequency resource set reserved to a feedback signal of the first signal is shared by the first cell group, the third time-frequency resource set belongs to one subset of the time-frequency resource set reserved to the feedback signal, and the target cell is used for determining the third time-frequency resource set in the time-frequency resource set reserved to the feedback signal.

In one embodiment, a signal transmitted in the third time-frequency resource set is scheduled by the target cell.

In one embodiment, a feedback signal transmitted by the target cell includes configuration information of the third time-frequency resource set.

Embodiment 15

Figure 15:
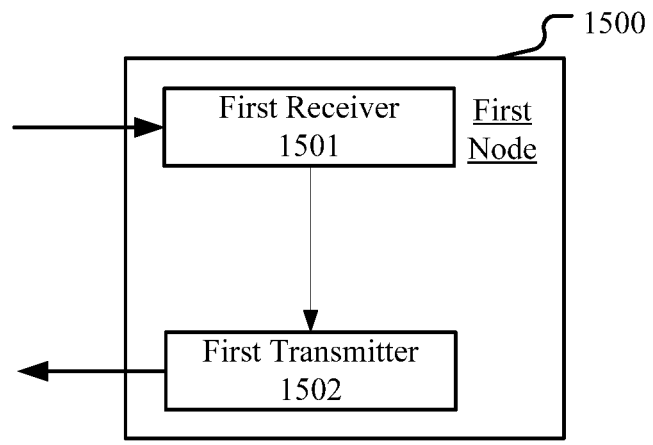
FIG. 15 is a structure block diagram illustrating a processing device in a first node according to one embodiment of the disclosure.

Embodiment 15 illustrates a structure block diagram of a processing device in a first node according to one embodiment of the disclosure, as shown in FIG. 15. In FIG. 15, the processing device 1500 in the first node includes a first receiver 1501 and a first transmitter 1502. In Embodiment 15, the first receiver 1501 receives a first signaling; and
the first transmitter 1502 transmits a first signal.

Herein, the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, the first signal is used for determining K2 candidate cells, and the target cell is one of the K2 candidate cells.

In one embodiment, the first signaling includes a third identifier, a cell to which the first node is attached is the first cell among the K1 cells, the third identifier is used for identifying the first cell among the K1 cells; and the third identifier is different from the first identifier.

In one embodiment, the first receiver 1501 receives a second signal in a third time-frequency resource set.

Herein, the second time-frequency resource set is used for determining the third time-frequency resource set; whether the second signal includes the second identifier is used for determining whether a transmitter of the second signal receives the first signal.

In one embodiment, the first receiver 1501 receives a second signal in a third time-frequency resource set.

Herein, the target cell is used for determining the third time-frequency resource set; whether the second signal includes the second identifier is used for determining whether a transmitter of the second signal receives the first signal.

In one embodiment, the first signal is used for indicating second information, and the second information is used for indicating priorities of the K2 candidate cells.

In one embodiment, the first transmitter 1502 transmits third information, the third information is used for indicating a first time set, time values in the first time set are associated to the K2 candidate cells, the first time set includes a first time value, and the first time value is used for indicating a maximum length of service time for which the first node is served by a cell associated to the first time value.

In one embodiment, the first node is one UE.

In one embodiment, the first node is one UE supporting a large latency.

In one embodiment, the first node is one UE supporting NTN.

In one embodiment, the first node is one air vehicle.

In one embodiment, the first node is one vehicle terminal.

In one embodiment, the first node is one relay.

In one embodiment, the first node is one ship.

In one embodiment, the first node is one UE in industrial IoT.

In one embodiment, the first node is one equipment supporting low-latency high-reliability transmission.

In one embodiment, the first receiver 1501 includes at least one of the antenna 452, the receiver 454, the receiving processor 456, the multiantenna receiving processor 458, the controller/receiver 459, the memory 460 or the data source 467 illustrated in Embodiment 4.

In one embodiment, the first transmitter 1502 includes at least one of the antenna 452, the transmitter 454, the transmitting processor 468, the multiantenna transmitting processor 457, the controller/processor 459, the memory 460 or the data source 467 illustrated in Embodiment 4.

Embodiment 16

Figure 16:
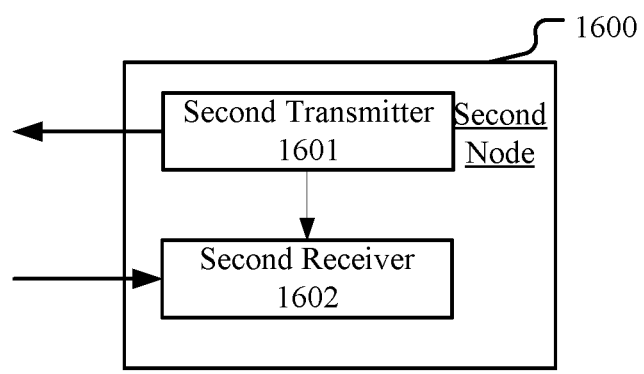
FIG. 16 is a structure block diagram illustrating a processing device in a second node according to one embodiment of the disclosure.

Embodiment 16 illustrates a structure block diagram of a processing device in a second node according to one embodiment of the disclosure, as shown in FIG. 16. In FIG. 16, the processing device 1600 in the second node includes a second transmitter 1601 and a second receiver 1602. In Embodiment 16, the second transmitter 1601 transmits a first signaling; and
the second receiver 1602 receives a first signal.

Herein, the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group includes K1 cells, and the K1 is a positive integer greater than 1; the first signal is used for determining a target cell, the target cell is one of the K1 cells, and the first cell is one cell in the first cell group.

In one embodiment, the first signal is used for determining K2 candidate cells, and the target cell is one of the K2 candidate cells.

In one embodiment, the first signaling includes a third identifier, a cell to which the first node is attached is the first cell among the K1 cells, the third identifier is used for identifying the first cell among the K1 cells; and the third identifier is different from the first identifier.

In one embodiment, the second transmitter 1601 transmits a second signal in a third time-frequency resource set.

Herein, the second time-frequency resource set is used for determining the third time-frequency resource set; whether the second signal includes the second identifier is used for determining whether a transmitter of the second signal receives the first signal.

In one embodiment, the second transmitter 1601 transmits a second signal in a third time-frequency resource set.

Herein, the target cell is used for determining the third time-frequency resource set; whether the second signal includes the second identifier is used for determining whether a transmitter of the second signal receives the first signal.

In one embodiment, the first signal is used for indicating second information, and the second information is used for indicating priorities of the K2 candidate cells.

In one embodiment, the second receiver 1602 receives third information, the third information is used for indicating a first time set, time values in the first time set are associated to the K2 candidate cells, the first time set includes a first time value, and the first time value is used for indicating a maximum length of service time for which the first node is served by a cell associated to the first time value.

In one embodiment, the second node is a base station.
In one embodiment, the second node is a satellite.
In one embodiment, the second node is a UE.
In one embodiment, the second node is a gateway.
In one embodiment, the second node is a base station supporting large latency.

In one embodiment, the second transmitter 1601 includes at least one of the antenna 420, the transmitter 418, the transmitting processor 416, the multiantenna transmitting processor 471, the controller/processor 475 or the memory 476 illustrated in Embodiment 4.

In one embodiment, the second receiver 1602 includes at least one of the antenna 420, the receiver 418, the receiving processor 470, the multiantenna receiving processor 472, the controller/receiver 475 or the memory 476 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, laptops, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, NTN UEs and other radio communication equipment. The base station or system equipment in the disclosure includes but not limited to macro-cellular base stations, micro-cellular base stations, home base stations, relay base station, gNBs (NR nodes B), Transmitter Receiver Points (TRPs), NTN base stations, satellite equipment, flight platform equipment and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first node for wireless communication, comprising:
a first receiver, to receive a first signaling, the first signaling comprising a first identifier and a second identifier; and
a first transmitter, to transmit a first signal;
wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group comprises K1 cells, and the K1 is a positive integer greater than 1; the first signal is used for determining a target cell, the target cell is one of the K1 cells, and the first cell is one cell in the first cell group; the first signaling is received from the first cell, the first signaling includes a System Information Block (SIB); when the first node selects to transmit the first signal in the second time-frequency resource set, the first node terminates the random access process initiated in the first time-frequency resource set.

2. The first node according to claim 1, wherein the first signal is used for determining K2 candidate cells, and the target cell is one of the K2 candidate cells.

3. The first node according to claim 1, wherein the first signaling comprises a third identifier, a cell to which the first node is attached is the first cell among the K1 cells, the third identifier is used for identifying the first cell among the K1 cells; and the third identifier is different from the first identifier.

4. The first node according to claim 1, comprising:
the first receiver receives a second signal in a third time-frequency resource set;
wherein the second time-frequency resource set is used for determining the third time-frequency resource set; whether the second signal comprises the second identifier is used for determining whether a transmitter of the second signal receives the first signal.

5. The first node according to claim 1, comprising:
the first receiver receives a second signal in a third time-frequency resource set;
wherein the target cell is used for determining the third time-frequency resource set; whether the second signal comprises the second identifier is used for determining whether a transmitter of the second signal receives the first signal.

6. The first node according to claim 4, wherein
a signal transmitted in the second time-frequency resource set and a signal transmitted in the third time-frequency resource set are associated to a same Synchronization Signal Block (SSB).

7. The first node according to claim 2, wherein the first signal is used for indicating second information, and the second information is used for indicating priorities of the K2 candidate cells.

8. The first node according to claim 2, comprising:
the first transmitter transmits third information, the third information is used for indicating a first time set, time values in the first time set are associated to the K2 candidate cells, the first time set comprises a first time value, and the first time value is used for indicating a maximum length of service time for which the first node is served by a cell associated to the first time value.

9. The first node according to claim 1, wherein the target cell has control plane and the target cell is not the first cell.

10. The first node according to claim 1, wherein
the first time-frequency resource set and the second time-frequency resource set have an association relationship in time or frequency, and, through indicating one of the time-frequency resource sets, the first signaling indicates implicitly the other time-frequency resource set.

11. The first node according to claim 2, wherein the first time-frequency resource set and the second time-frequency resource set have an association relationship in time or frequency, and, through indicating one of the time-frequency resource sets, the first signaling indicates implicitly the other time-frequency resource set.

12. A second node for wireless communication, comprising:
a second transmitter, to transmit a first signaling, the first signaling comprising a first identifier and a second identifier; and
a second receiver, to receive a first signal;
wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group comprises K1 cells, and the K1 is a positive integer greater than 1; the first signal is used for determining a target cell, the target cell is one of the K1 cells, and the first cell is one cell in the first cell group; the first signaling is received from the first cell, the first signaling includes a System Information Block (SIB) wherein the first signaling comprises a third identifier, a cell to which a transmitter of the first signal is attached is the first cell among the K1 cells, the third identifier is used for identifying the first cell among the K1 cells; and the third identifier is different from the first identifier.

13. The second node according to claim 12, wherein the first signal is used for determining K2 candidate cells, and the target cell is one of the K2 candidate cells.

14. The second node according to claim 12, wherein the second transmitter transmits a second signal in a third time-frequency resource set;
wherein the second time-frequency resource set is used for determining the third time-frequency resource set; whether the second signal comprises the second identifier is used for determining whether a transmitter of the second signal receives the first signal.

15. The second node according to claim 12, comprising:
the second transmitter transmits a second signal in a third time-frequency resource set;
wherein the target cell is used for determining the third time-frequency resource set; whether the second signal comprises the second identifier is used for determining whether a transmitter of the second signal receives the first signal.

16. The second node according to claim 14, wherein a signal transmitted in the second time-frequency resource set and a signal transmitted in the third time-frequency resource set are associated to a same SSB.

17. The second node according to claim 13, comprising:
the second receiver receives third information, the third information is used for indicating a first time set, time values in the first time set are associated to the K2 candidate cells, the first time set comprises a first time value, and the first time value is used for indicating a maximum length of service time for which the transmitter of the first signal is served by a cell associated to the first time value.

18. A method in a first node for wireless communication, comprising:
receiving a first signaling, the first signaling comprising a first identifier and a second identifier; and
transmitting a first signal;
wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group comprises K1 cells, and the K1 is a positive integer greater than 1; the first signal is used for determining a target cell, the target cell is one of the K1 cells, and the first cell is one cell in the first cell group; the first signaling is received from the first cell, the first signaling includes a System Information Block (SIB); when the first node selects to transmit the first signal in the second time-frequency resource set, the first node terminates the random access process initiated in the first time-frequency resource set.

19. A method in a second node for wireless communication, comprising:
transmitting a first signaling, the first signaling comprising a first identifier and a second identifier; and
receiving a first signal;
wherein the first signaling is used for determining a first time-frequency resource set and a second time-frequency resource set, the first time-frequency resource set and the second time-frequency resource set are associated to the first identifier and the second identifier respectively, the first time-frequency resource set and the second time-frequency resource set are both used for random access; the first signal is transmitted in the second time-frequency resource set; the first identifier is associated only to a first cell, the second identifier is associated to a first cell group, the first cell group comprises K1 cells, and the K1 is a positive integer greater than 1; the first signal is used for determining a target cell, the target cell is one of the K1 cells, and the first cell is one cell in the first cell group; the first signaling is received from the first cell, the first signaling includes a System Information Block (SIB); wherein the first signaling comprises a third identifier, a cell to which a transmitter of the first signal is attached is the first cell among the K1 cells, the third identifier is used for identifying the first cell among the K1 cells; and the third identifier is different from the first identifier.

* * * * *